US008578343B2

(12) United States Patent
Scholz et al.

(10) Patent No.: US 8,578,343 B2
(45) Date of Patent: Nov. 5, 2013

(54) SYSTEM AND METHOD FOR OVERFLOW DETECTION USING PARTIAL EVALUATIONS

(75) Inventors: Bernhard F. Scholz, Sydney (AU); Cristina N. Cifuentes, Forest Lake (AU); Nathan Robert Albert Keynes, Kuraby (AU)

(73) Assignee: Oracle America, Inc., Redwood City, CA (US)

(*) Notice: Subject to any disclaimer, the term of this patent is extended or adjusted under 35 U.S.C. 154(b) by 925 days.

(21) Appl. No.: 12/688,078

(22) Filed: Jan. 15, 2010

(65) Prior Publication Data

US 2011/0179400 A1 Jul. 21, 2011

(51) Int. Cl.
*G06F 9/44* (2006.01)

(52) U.S. Cl.
USPC .......................................... 717/131; 717/135

(58) Field of Classification Search
None
See application file for complete search history.

(56) References Cited

U.S. PATENT DOCUMENTS

| | | | | |
|---|---|---|---|---|
| 5,475,842 A | * | 12/1995 | Gilbert et al. | 717/160 |
| 5,659,754 A | * | 8/1997 | Grove et al. | 717/158 |
| 5,793,374 A | * | 8/1998 | Guenter et al. | 345/426 |
| 6,286,104 B1 | * | 9/2001 | Buhle et al. | 726/4 |
| 6,367,071 B1 | * | 4/2002 | Cao et al. | 717/160 |
| 6,823,507 B1 | * | 11/2004 | Srinivasan et al. | 717/152 |
| 7,047,463 B1 | * | 5/2006 | Organ et al. | 714/724 |
| 8,156,284 B2 | * | 4/2012 | Vorbach et al. | 711/118 |
| 2002/0040470 A1 | * | 4/2002 | Guthrie et al. | 717/126 |
| 2007/0050603 A1 | * | 3/2007 | Vorbach et al. | 712/221 |
| 2007/0083933 A1 | * | 4/2007 | Venkatapathy et al. | 726/25 |
| 2008/0040120 A1 | * | 2/2008 | Kurniawati et al. | 704/500 |
| 2009/0259989 A1 | * | 10/2009 | Cifuentes et al. | 717/110 |
| 2010/0299662 A1 | * | 11/2010 | Chilimbi et al. | 717/170 |

OTHER PUBLICATIONS

Ayewah, N., Pugh, J., Morgenthaler, D., Penix, J., and Zhou, Y., "Evaluating Static Analysis Defect Warnings on Production Software," Proceedings of the 7th ACM SIGPLAN-SIGSOFT Workshop on Program Analysis for Software Tools and Engineering, Jun. 2007 (7 pages).

Blanchet, B., Cousot, P., Cousot, R., Feret, J., Mauborgne, L., Mine, A., Monniaux, D., and Rival, X., "A Static Analyzer for Large Safety-Critical Software." Proceedings of the ACM SIGPLAN-SIGSOFT Conference on Programming Language Design and Implementation, ACM, Jun. 2003 (12 pages).

Cifuentes, C. and Scholz, B., "Parfait—Designing a Scalable Bug Checker," Proceedings of the ACM SIGPLAN Static Analysis Workshop, Jun. 2008 (8 pages).

(Continued)

*Primary Examiner* — Jason Mitchell
(74) *Attorney, Agent, or Firm* — Osha Liang LLP (57) ABSTRACT

A method for overflow detection using partial evaluations. The method includes obtaining a section of code from a source code file stored on a storage device, analyzing the section of code to identify a buffer with an index, determining a plurality of statements that are statically-computable and dependent on the index of the buffer, and generating a code segment including the plurality of statements. The method further includes replacing an access statement of the plurality of statements with a conditional statement returning true when bounds of the buffer are exceeded, where the access statement uses the index to access the buffer, adding an unconditional statement returning false to the code segment, and executing the code segment on a computer processor to obtain a determination of whether the bounds of the buffer are exceeded.

17 Claims, 5 Drawing Sheets

(56) References Cited

OTHER PUBLICATIONS

Cytron, R., Ferrante, J., Rosen, B.K., Wegman, M.N. and Zadeck, F.K., "Efficiently Computing Static Single Assignment Form and the Control Dependence Graph," ACM Transactions on Programming Languages and Systems, vol. 13, No. 4, Oct. 1991 (40 pages).

Deutsch, A., "Static Verification of Dynamic Properties," Polyspace White Paper, Nov. 2003 (8 pages).

Engler, D., Chelf, B., Chou, A., and Hallem, S., "Checking System Rules Using System-Specific Programmer-Written Compiler Extensions," Proceedings of the Fourth Symposium on Operating Systems Design and Implementation, San Diego, California, Oct. 2000 (16 pages).

Engler, D., Chen, D.Y., Hallem, S., Chou, A., and Chelf, B., "Bugs as deviant behavior: A General Approach to Inferring Errors in Systems Code," Proceedings of the Eighteenth Acm Symposium on Operating Systems Principles, Alberta, Canada, Oct. 2001 (16 pages).

Fortify Static Code Analysis (SCA). http://www.fortify.com/products/sca. Accessed Mar. 2007. (2 pages).

Johnson, S.C., "Lint, a C Program Checker," Technical Report 65, Bell Laboratories, Jul. 1978 (12 pages).

Lattner, C., and Adve, V., "LLVM: A Compliation Framework for Lifelong Program Analysis and Transformation," Proceedings of the 2004 International Symposium on Code Generation and Optimization, Mar. 2004 (21 pages).

LLVM/Clang Static Analyzer. http://clang.llvm.org/StaticAnalysis.html. Accessed Jul. 2008. (2 pages).

Scholz, B., Zhang, C. and Cifuentes, C., "User-Input Dependence Analysis via Graph Reachability," Technical Report SMLI TR-2008-171, Sun Microsystems Laboratories, Menlo Park, California, Mar. 2008 (30 pages).

Webster, M., Leveraging Static Analysis for a Multidimensional View of Software Quality and Security: Klocwork's Solution, White Paper, IDC, Framingham, Massachusetts, Sep. 2005 (13 pages).

\* cited by examiner

PRIOR ART

FIG. 4

SYSTEM AND METHOD FOR OVERFLOW DETECTION USING PARTIAL EVALUATIONS

BACKGROUND

Buffer overflows are a common cause of security vulnerabilities in system code. Specifically, a buffer overflow occurs when a process stores or reads data in a buffer outside of the memory allocated for the process. The overflow may cause diverse errors including erratic program behavior, memory access errors, incorrect results, program crashes, and security breaches. A variety of techniques have been developed to attempt to locate buffer overflows in code before they occur, including both dynamic and static techniques.

More specifically, a variety of software tools have been developed for performing static analyses of source code. For example, C language source code may be analyzed by a software tool capable of locating suspicious code (e.g., buffer overflows, structured query language injections, deadlocks, race conditions, etc.) that is likely to cause an error. Typically, a static analysis of source code is performed using an abstraction (i.e., a model) of the program associated with the source code. While various techniques have been developed to speed up static analyses, the efficiencies gained from the various techniques typically come at the cost of less accurate results.

In addition, partial evaluation was originally introduced more than 30 years ago, and has been applied in a variety of applications including program optimization by specialization. A partial evaluation may be performed by locating static input data in a program (and propagated in the program flow) and then computing expressions and statements using the static input data at compile-time, which results in a faster but semantically equivalent program. The newly generated program may be referred to as a residual program. However, the application of partial evaluations is typically focused on program optimizations during execution.

SUMMARY

In general, in one aspect, the invention relates to a method for overflow detection using partial evaluations. The method includes obtaining a section of code from a source code file stored on a storage device, analyzing the section of code to identify a buffer with an index, determining a number of statements that are statically-computable and dependent on the index of the buffer, and generating a code segment including the number of statements. The method further includes replacing an access statement of the number of statements with a conditional statement returning true when bounds of the buffer are exceeded, where the access statement uses the index to access the buffer, adding an unconditional statement returning false to the code segment, and executing the code segment on a computer processor to obtain a determination of whether the bounds of the buffer are exceeded.

In general, in one aspect, the invention relates to a system for overflow detection using partial evaluations. The system includes a memory, and a processor, operatively connected to the memory and having functionality to execute instructions for obtaining a section of code from a source code file, analyzing the section of code to identify a buffer with an index, determining a number of statements that are statically-computable and dependent on the index of the buffer, and generating a code segment including the number of statements. The processor of the system further having functionality to execute instructions for replacing an access statement of the number of statements with a conditional statement returning true when bounds of the buffer are exceeded, where the access statement uses the index to access the buffer, adding an unconditional statement returning false to the code segment, and executing the code segment to obtain a determination of whether the bounds of the buffer are exceeded.

In general, in one aspect, the invention relates to a computer readable storage medium storing instructions for overflow detection using partial evaluations. The instructions including functionality to obtain a section of code from a source code file, analyze the section of code to identify a buffer with an index, determine a number of statements that are statically-computable and dependent on the index of the buffer, and generate a code segment including the number of statements. The instructions further including functionality to replace an access statement of the number of statements with a conditional statement returning true when bounds of the buffer are exceeded, where the access statement uses the index to access the buffer, add an unconditional statement returning false to the code segment, and execute the code segment to obtain a determination of whether the bounds of the buffer are exceeded.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicated the description.

Throughout this specification the terms "overflow," "buffer overflow," and "exception" may be used interchangeably. Broadly speaking, a buffer overflow occurs when a process stores or reads data in a buffer outside of the memory assigned to the process. When a buffer overflow occurs, the data outside the memory assigned to the process may overwrite adjacent memory. However, this invention should not be limited to detecting buffer overflows. For example, integer overflows may also be detected in one or more embodiments of the invention. It will be apparent to one of ordinary skill in the art that the present invention may be used in a variety of techniques involving a boundary computation. In addition, the invention may be used for bug checking and other suitable purposes.

In general, embodiments of the invention provide a system and method for overflow detection using partial evaluations. Specifically, in one or more embodiments of the invention, the method analyzes code prior to execution of the code to generate a code segment from a portion of the source code, where the code segment includes an access of a buffer with an index. The portion of code to be used for the code segment includes statements that have either immediate or intermediate data and control dependencies with the statement performing the access of the memory that may cause a buffer overflow. In this case, the code segment used to perform the overflow detection does not depend on program input (i.e., the statements with control dependencies are statically-computable) and, thus, may be executed at compile-time without requiring input data for the program. The method may then determine if an overflow occurs by replacing the statement that accesses memory in the code segment with a boundary test, where the boundary test evaluates whether a buffer overflow occurs. Since the code segment is executable at compile-time, the evaluation of the code segment to locate a buffer overflow is static and feasible.

A partial evaluation is a specialization of a program for program inputs that are static and known at compile time. In one or more embodiments of the invention, the partial evaluation is performed by specializing a code segment, where the code segment includes a subset of code from a source code file. In this case, the subset of code does not include dependencies on the input of the program. Further, the code segment is also instrumented with additional code to prepare the subset of code to be evaluated (i.e., executed) at compile time. For example, the subset of code may be encapsulated within a function body, allowing the code segment to be either interpreted or compiled for evaluating on buffer overflows.

Figure 1:
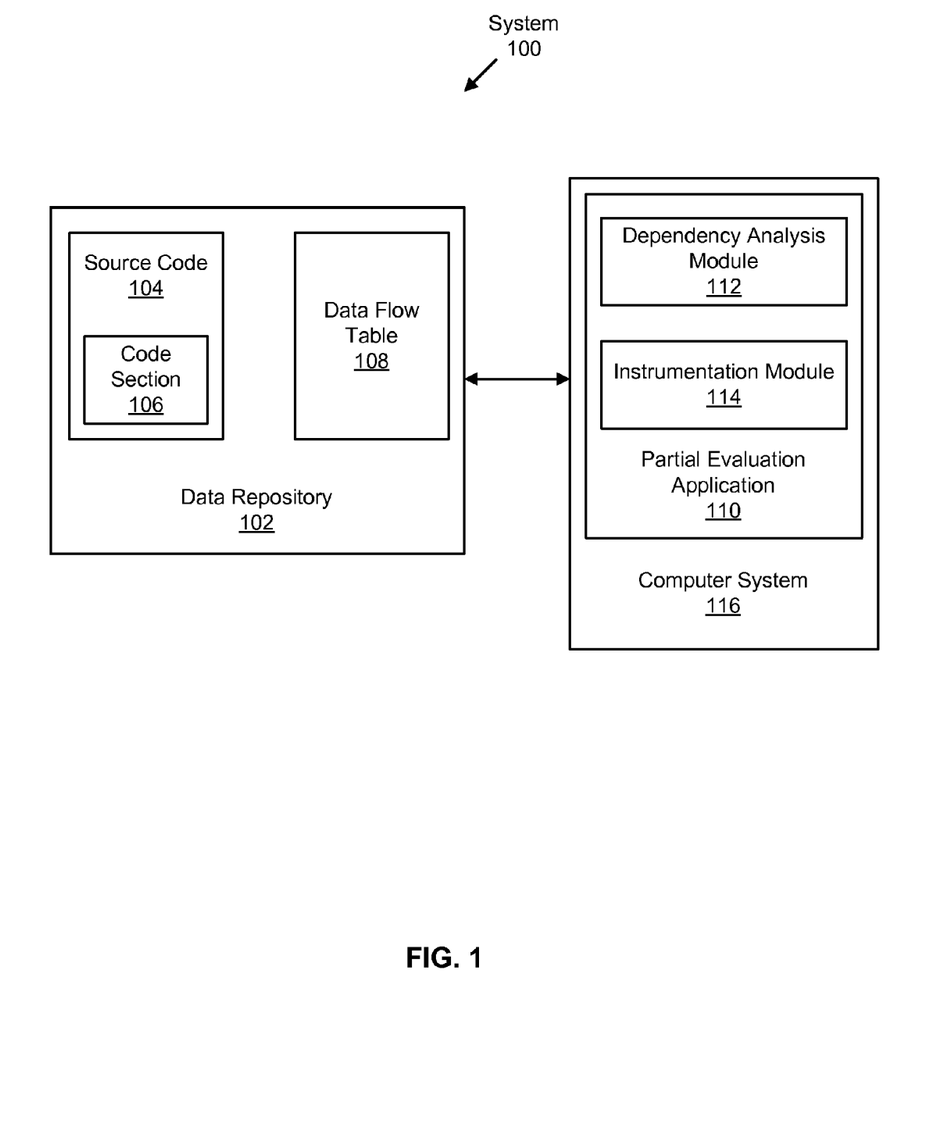
FIG. 1 shows a diagram of a system in accordance with one or more embodiments of the invention.

FIG. 1 shows a diagram of a system (100) in accordance with one or more embodiments of the invention. The system includes a Data Repository (102) interacting with a Computer System (116). The Data Repository (102) further includes Source Code (104) and a Data Flow Table (108). The Computer System (116) further includes a Partial Evaluation Application (110). Each of the aforementioned components of FIG. 1 is discussed below.

Data Repository (102) may be any device capable of storing data (e.g., a computer system, a server, a hard drive, memory, a flash drive, etc). The Data Repository (102) may store software applications, code files, and/or any other data related to code analysis. The Data Repository (102) is operatively connected to the Partial Evaluation Application (110). In one or more embodiments of the invention, instructions related to the Partial Evaluation Application (110) may be stored in the Data Repository (102). Alternatively, the instructions related to the Partial Evaluation Application (110) may be stored on a different data storage device.

Source Code (104) may be stored in the Data Repository (102). In one or more embodiments of the invention, the Source Code (104) may be of a variety of programming languages (e.g., C, C++, Java, Pascal, Visual Basic, Python, etc), and related to any type of software application. The Source Code (104) may contain a Code Section (106), which corresponds to a subset of code to be analyzed by the Partial Evaluation Application (110) for buffer overflows. One of ordinary skill in the art will recognize that any amount of the Source Code (104) may be analyzed when performing partial evaluations. Further, the Data Repository (102) may include a Data Flow Table (108), which may be used for storing data flow equations. In one or more embodiments of the invention, the Data Flow Table (108) may be any data structure suitable for storing data flow equations. The data flow equations may be used to generate a code segment of the control flow graph, which may then be used to partially evaluate the Source Code (110). In this case, the control flow graph for the Source Code (110) may allow for the identification of all statements that immediately or intermediately depend on a statement performing a memory access.

In one or more embodiments of the invention, the Partial Evaluation Application (110) includes a Dependency Analysis Module (112) and an Instrumentation Module (114). The Partial Evaluation Application (110) may be, for example, a software application or module that includes instructions for performing partial evaluations of program code. A partial evaluation may refer to the execution of the Code Section (106) of Source Code (104). In one or more embodiments of the invention, the Partial Evaluation Application (110) may be executed on a Computer System (116). For example, the Computer System (116) may be as described with respect to FIG. 4 below.

In one or more embodiments of the invention, the Dependency Analysis Module (112) analyzes dependencies in the Source Code (104). Specifically, the Dependency Analysis Module (112) may identify statements in the Source Code (104) that have dependencies on the value of an index. In this case, the statements having dependencies may be identified using data flow equations stored in the Data Flow Table (108). For example, the Dependency Analysis Module (112) may be configured to use the data flow equations stored in the Data Flow Table (108) to generate a code segment that includes all statements in the control flow graph that are required to compute the value of an index used in the Source Code (104). Specifically, the data flow equations may be applied to a control flow graph to obtain either (1) a refined control graph with new edges for tracking basic blocks in the control flow graph where dependent statements exist or (2) a new control graph including the basic blocks of the control flow graph where dependent statements exist, which may then be used to identify statements for including in the code segment. In this example, the control flow graph may be in single assignment form ("SSA"). The SSA representation may be augmented by including predicates in the phi nodes of the control flow graph, where the predicates represent control dependencies of the variables stored in the phi nodes. The predicates allow the Dependency Analysis Module (112) to identify statements having dependencies on a variable, such as an index of a buffer, in the Source Code (104).

Those skilled in the art will appreciate that SSA is an intermediate representation of source code, where each variable is only assigned once in the intermediate representation. Specifically, when an existing variable is assigned values in the source code, the assignment of the existing variable is represented by a new version of the variable in SSA (i.e., each assignment of the variable is represented by a new version of the variable).

In one or more embodiments of the invention, statements having dependencies on the value of the index may include statements that determine the value of the index and/or statements that are affected by the value of the index. For example, a for loop with an index access to a buffer includes statements having dependencies on the values of the index. In this example, the value of the index may be set during each iteration of the for loop, where the index is then used to access the buffer during each iteration of the for loop. It will be apparent to one of ordinary skill in the art that the Source Code (104) may include statements having dependencies on a number of indexes. In this case, partial evaluations may be performed for statements dependent on each of the indexes.

In one or more embodiments of the invention, the Instrumentation Module (114) may be a software module configured to modify a Code Section (106) of the Source Code (104) to be evaluated. Specifically, the Instrumentation Module (114) may be configured to pad the Code Section (106) with a function call and a bounds check, where the padded Code Section (106) (i.e., code segment) may be interpreted or compiled and then executed to determine whether the bounds are exceeded. Those skilled in the art will appreciate that the Code Section (106) may be padded in a variety of manners to prepare the Code Section (106) for execution.

In one or more embodiments of the invention, a static bug checker (not shown) may be configured to interact with the Partial Evaluation Application (110). For example, in the case of buffer overruns, the static bug checker may perform a pass over the Source Code (104) while applying several analyses to the Source Code (104) (e.g., constant array bounds checks, partial evaluation, symbolic analysis, etc.). The Partial Evaluation Application (110) may be implemented as described above during a pass of the static bug checker. In this case, a code segment generated by the Instrumentation Module (114) may be executed by the static bug checked using an interpreter and/or a just-in-time (JIT) compiler. Further, a bail out condition may also be used in case the code segment results in an endless loop or in the case of long-running loops (e.g., configured to only perform a set number of iterations).

Figure 2:
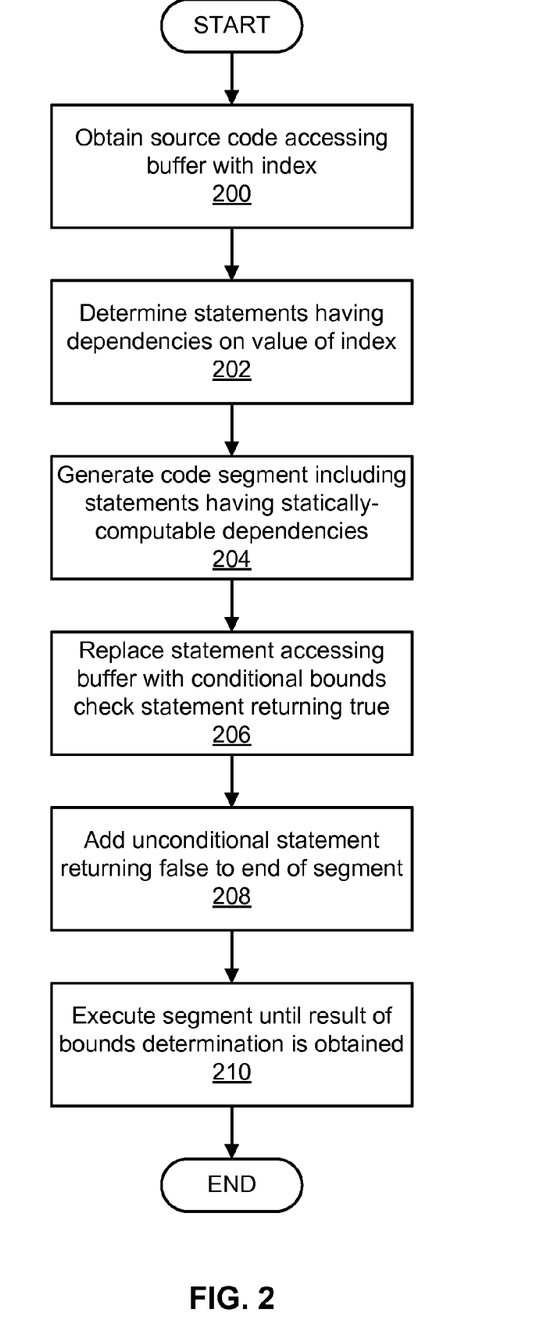
FIG. 2 shows a flowchart of a method in accordance with one or more embodiments of the invention.

FIG. 2 shows a flowchart of a method for partial evaluations in accordance with one or more embodiments of the invention. The method of FIG. 2 may be implemented, for example, using the system of FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, source code accessing a buffer with an index is obtained for analysis. The source code may be obtained from a variety of storage devices, including both local and remote storage devices. In one or more embodiments of the invention, the location of the source code may be specified by a user. Alternatively, the source code may be automatically obtained during an analysis of a program, or any other suitable method may be used to obtain the source code. Those skilled in the art will appreciate that the buffer may correspond to a statically defined buffer or a dynamically defined buffer.

In Step 202, the source code may be analyzed to identify statements having dependencies on the value of the index. The source code may include a number of indexes, where each index may be associated with a set of statements having dependencies. In this case, each of the sets of statements having dependencies may be analyzed independently as described below. For example, a statement dependent on an index may include a statement accessing a buffer with the index. In addition, statements dependent on the index may also refer to the portion of source code associated with determining the value of the index.

In Step 204, a code segment including the statements having dependencies on the value of the index is generated. Specifically, after confirming that the dependencies are statically-computable, a code segment including the statements having the dependencies may be generated. For example, the statements having dependencies may be padded with a main function call to obtain a code segment, where the code segment is capable of being interpreted or compiled and then executed.

In Step 206, the statement accessing the buffer with the index is replaced with a conditional statement. Specifically, the statement accessing the buffer may be replaced with a conditional statement that returns true when the bounds of the buffer are exceeded. For example, the conditional statement may compare the value of the index to the size of the buffer and return true when the index exceeds the size of the buffer. Those skilled in the art will appreciate that an overflow may be detected using a conditional statement that checks the relevant bounds of the variable of interest (e.g., a buffer, integer variable, etc.).

In Step 208, an unconditional statement is added to the end of the code segment. The unconditional statement is configured to confirm that the bounds of the buffer are not exceeded after all other statements in the code segment have been executed.

In Step 210, the code segment is evaluated. Specifically, the code segment is executed to determine whether the bounds of the buffer are exceeded. For example, if the bounds of the buffer are exceeded, the conditional statement added in Step 206 will return true when the value of the index exceeds the size of the buffer. Those skilled in the art will appreciate that execution of the code segment, as opposed to the entire set of statements in the source code, reduces the amount of time required to analyze the index access to the buffer. The reduced time required to analyze the code segment allow for vast amounts of source code to be analyzed while only requiring the evaluation of subsets of statements in the source code.

Figure 3A:
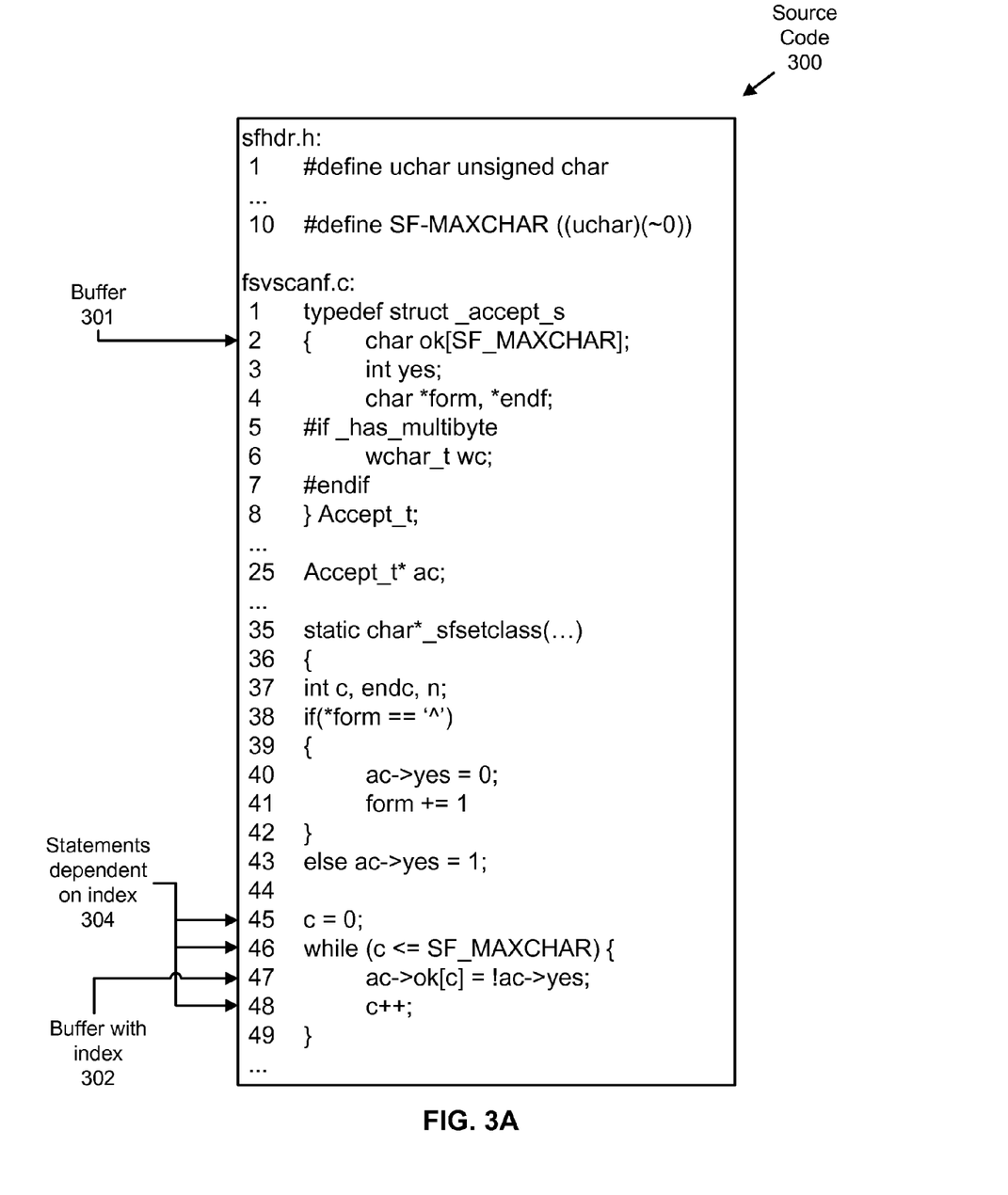
FIGS. 3A-B show an example in accordance with one or more embodiments of the invention.
Figure 3B:
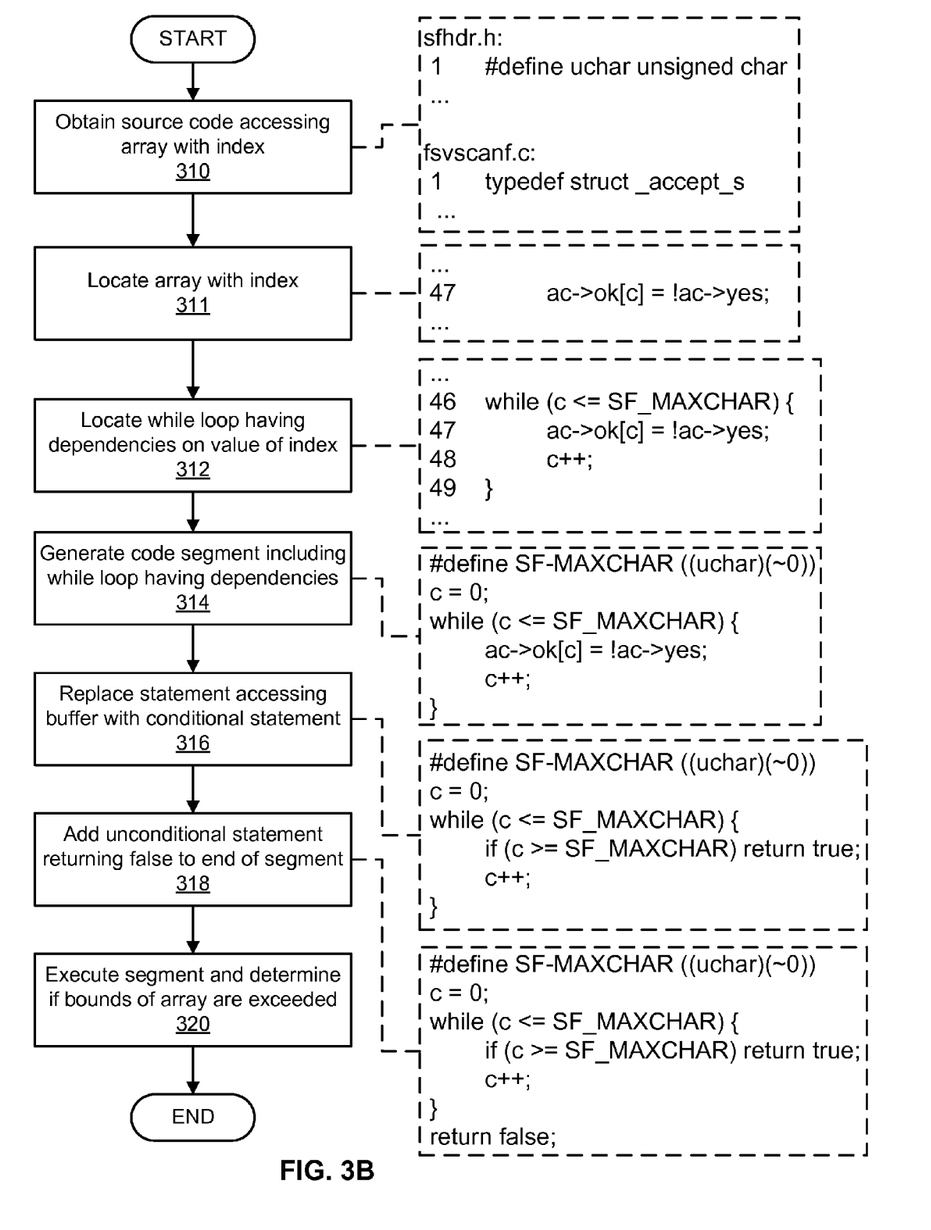

FIG. 3A-B show examples in accordance with one or more embodiments of the invention. Specifically, the example in FIG. 3A shows Source Code (300), and FIG. 3B shows an example of the method described above with respect to FIG. 2 in view of the Source Code shown in FIG. 3A. The examples of FIGS. 3A-B have been simplified to aid in the understanding of the invention and, as such, the invention should not be limited to these examples.

FIG. 3A shows Source Code (300), which contains a buffer (301), a buffer with an index (302), and statements having dependencies on the index (304). For the purposes of this example, Source Code (300) contains code written in the C programming language, but the invention is not limited to the C programming language, and may be used to analyze code from any programming language. FIG. 3A also shows that the buffer (301) is the character array ok, which is initialized with a size of SF_MAXCHAR. Further, the buffer with an index (302) is the statement accessing the character array ok with the index c. In one or more embodiments of the invention, other statements may also be identified as including a buffer with an index. However, for ease of explanation, this example will focus on the character array ok.

FIG. 3A also shows statements having dependencies on the index (304). Specifically, the statements having dependencies on the index (304) include (1) a statement setting the value of the index c to 0; (2) a while statement including a condition related to the index c; and (3) a statement incrementing the value of the index c. It will be apparent to one of ordinary skill in the art that program controls besides a while statement may have dependencies on an index of a buffer. In general, when executed, the code in Source Code (300) sets the character values in character array ok based on the value of the character form. Specifically, each character in the character array ok is assigned based on the integer yes, whose value is determined based on the value of the character form.

FIG. 3B shows an example of a partial evaluation in view of the Source Code (300) of FIG. 3A. To aid in understanding of the invention, only the portions of Source Code (300) relevant to the partial evaluation are displayed with respect to the relevant steps of FIG. 3B. In one or more embodiments of the invention, one or more of the boxes shown in FIG. 3B may be omitted, repeated, and/or performed in a different order than the order shown in FIG. 3B. Accordingly, the scope of the invention should not be considered limited to the specific arrangement of steps shown in FIG. 3B.

Initially, in Step 310, source code including a statement accessing an array with an index is obtained. In this example, the source code includes two source code files, sfhdr.h and fsyscanf.c, corresponding to the source code shown above in FIG. 3A.

In Step 311, the statement accessing the array with the index is located. In this example, the statement accessing the array with the index corresponds to the access of the array ok using the index c.

In Step 312, a while loop having dependencies on the value of the index c is located. Specifically, the while loop includes a condition related to the value of the integer c, which is then used within the while loop as the index for accessing the character array ok. In this case, the statements have a dependency on the index c because the statements either rely on or change the value of the index c.

In Step 314, a code segment including the while loop is generated. For example, the code segment may be generated by padding the while loop with a main function call. In this example, the padded code segment is capable of being interpreted or compiled and then executed.

In Step 316, the statement accessing the buffer ok is replaced with a conditional statement. In this example, the conditional statement confirms that the bounds (i.e., SF_MAXCHAR) of the buffer ok are not exceeded. In other words, if the bounds of ok are exceeded, the conditional statement returns true.

In Step 318, an unconditional statement returning true is added to the end of the code segment. The unconditional statement is configured to be executed after the execution of the for loop is completed. In other words, execution of the code segment will only reach the unconditional statement if the for loop fails to return true during execution.

In Step 320, the code segment is executed, and a determination as to whether the bounds of the array ok are exceeded is made. In this case, execution of the code segment will return true because the buffer ok is exceeded when the value of the integer c is assigned the value SF_MAXCHAR.

Figure 4:
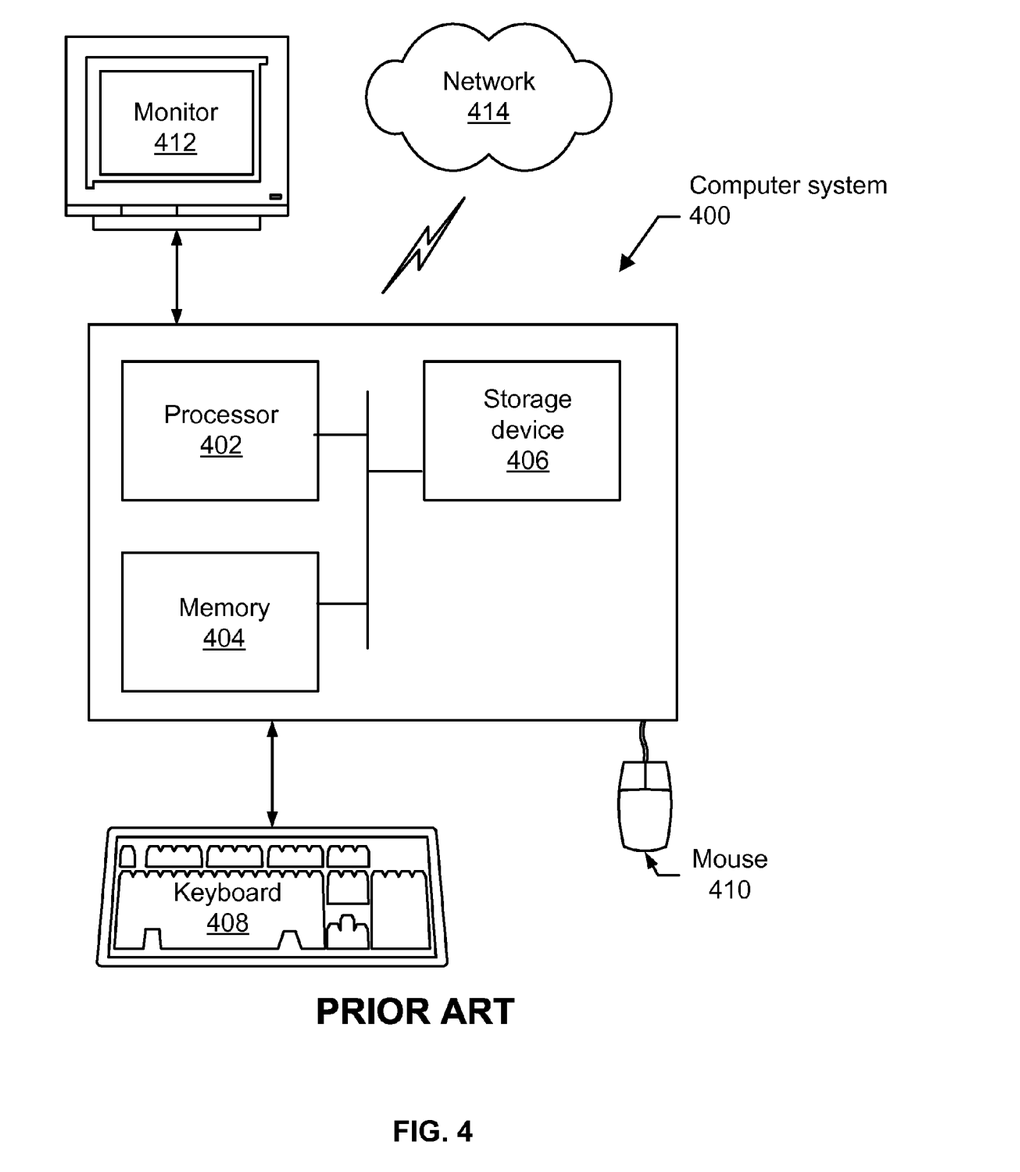
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (400) includes at least the minimal processing, input, and/or output means necessary to particularly practice embodiments of the invention.

Further, those skilled in the art will appreciate that one or more elements of the aforementioned computer system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for overflow detection using partial evaluations comprising:
    obtaining a section of code from a source code file stored on a storage device;
    identifying, within the section of code, an access statement to access a buffer;
    identifying, within the access statement, an index used to access the buffer, wherein the index is statically-computable;
    determining bounds of the buffer;
    identifying a plurality of statements that are statically-computable and affect the index;
    generating a code segment comprising the plurality of statements and the access statement;
    replacing the access statement of the code segment with a conditional statement returning true when the index exceeds the bounds of the buffer;
    adding an unconditional statement returning false to the code segment;
    adding a bail out conditional statement to the code segment, wherein the bail out conditional statement is configured to interrupt execution of the code segment when a specified number of iterations in the code segment are performed;
    executing the code segment on a computer processor to obtain a return value of the code segment; and
    determining, based on the return value, that the bounds of the buffer were exceeded during execution of the code segment.

2. The method of claim 1, wherein identifying the plurality of statements comprises:
    applying a plurality of data flow equations to a control flow graph to obtain an updated control flow graph; and
    using the updated control flow graph to identify the plurality of statements that are dependent on the index.

3. The method of claim 2, wherein the control flow graph represents the section of code in single assignment form.

4. The method of claim 1, wherein a size of the code segment is dependent on a control statement, wherein the plurality of statements comprises the control statement.

5. The method of claim 1, wherein a size of the buffer is statically computable.

6. The method of claim 1, wherein the code segment is executed using at least one of a group consisting of interpretation and just-in-time compilation techniques.

7. A system for overflow detection using partial evaluations comprising:
a memory; and
a processor operatively connected to the memory and having functionality to execute instructions for:
obtaining a section of code from a source code file stored on a storage device;
identifying, within the section of code, an access statement to access a buffer;
identifying, within the access statement, an index used to access the buffer, wherein the index is statically-computable;
determining bounds of the buffer;
identifying a plurality of statements that are statically-computable and affect the index;
generating a code segment comprising the plurality of statements and the access statement;
replacing the access statement of the code segment with a conditional statement returning true when the index exceeds the bounds of the buffer;
adding an unconditional statement returning false to the code segment;
adding a bail out conditional statement to the code segment, wherein the bail out conditional statement is configured to interrupt execution of the code segment when a specified number of iterations in the code segment are performed;
executing the code segment on a computer processor to obtain a return value of the code segment; and
determining, based on the return value, that the bounds of the buffer were exceeded during execution of the code segment.

8. The system of claim 7, wherein identifying the plurality of statements comprises:
applying a plurality of data flow equations to a control flow graph to obtain an updated control flow graph; and
using the updated control flow graph to identify the plurality of statements that are dependent on the index.

9. The system of claim 8, wherein the control flow graph represents the section of code in single assignment form.

10. The system of claim 7, wherein a size of the code segment is dependent on a control statement, wherein the plurality of statements comprises the control statement.

11. The system of claim 7, wherein a size of the buffer is statically computable.

12. The system of claim 7, wherein the code segment is executed using at least one of a group consisting of interpretation and just-in-time compilation techniques.

13. A non-transitory computer readable medium storing instructions for overflow detection using partial evaluations, the instructions comprising functionality to:
obtain a section of code from a source code file stored on a storage device;
identify, within the section of code, an access statement to access a buffer;
identify, within the access statement, an index used to access the buffer, wherein the index is statically computable;
determine bounds of the buffer;
identify a plurality of statements that are statically-computable and affect the index;
generate a code segment comprising the plurality of statements and the access statement;
replace the access statement of the code segment with a conditional statement returning true when the index exceeds the bounds of the buffer;
add an unconditional statement returning false to the code segment;
add a bail out conditional statement to the code segment, wherein the bail out conditional statement is configured to interrupt execution of the code segment when a specified number of iterations in the code segment are performed;
execute the code segment on a computer processor to obtain a return value of the code segment; and
determine, based on the return value, that the bounds of the buffer were exceeded during execution of the code segment.

14. The non-transitory computer readable medium of claim 13, wherein identifying the plurality of statements comprises:
applying a plurality of data flow equations to a control flow graph to obtain an updated control flow graph; and
using the updated control flow graph to identify the plurality of statements that are dependent on the index.

15. The non-transitory computer readable medium of claim 14, wherein the control flow graph represents the section of code in single assignment form.

16. The non-transitory computer readable medium of claim 13, wherein a size of the code segment is dependent on a control statement, wherein the plurality of statements comprises the control statement.

17. The non-transitory computer readable medium of claim 13, wherein a size of the buffer is statically computable.

* * * * *